United States Patent [19]

Kanazawa et al.

[11] Patent Number: 4,464,046

[45] Date of Patent: Aug. 7, 1984

[54] COPYING MACHINE CAPABLE OF CONTINUOUSLY VARYING MAGNIFICATION

[75] Inventors: Yukio Kanazawa; Toshikatsu Takahashi; Yoshiyuki Ishitate, all of Kanagawa, Japan

[73] Assignee: Fuji Xerox Co., Ltd., Tokyo, Japan

[21] Appl. No.: 362,942

[22] Filed: Mar. 29, 1982

[30] Foreign Application Priority Data

Apr. 30, 1981 [JP] Japan ................................ 56-65987

[51] Int. Cl.³ .............................................. G03B 27/70

[52] U.S. Cl. ........................................ 355/57; 355/60

[58] Field of Search ........................ 355/55, 56, 57, 60

[56] References Cited

U.S. PATENT DOCUMENTS 2,100,967 11/1937 Levy .................................... 355/57
3,779,642 12/1973 Ogawa et al. ......................... 355/56
3,848,996 11/1974 Goding ................................ 355/60
3,947,188 3/1976 Simpson ............................... 355/57
4,060,324 11/1977 Wakatsuki ............................ 355/60

*Primary Examiner*—Monroe H. Hayes
*Attorney, Agent, or Firm*—Sughrue, Mion, Zinn, Macpeak and Seas

[57] ABSTRACT

In a copying machine having an optical system for directing an image from a microfilm onto a photosensitive drum either of two fixed focus projecting lenses may be moved into alignment with the microfilm. Each projecting lens is provided with an adjustable drive system for moving the projecting lens along the optical axis thereof to vary the magnification. A plurality of mirrors are provided for reflecting the image received from said projecting lens onto the photosensitive drum. Two of the mirrors are supported at right angles to each other on a support member for reflecting an incident beam of light on one of the mirrors in a direction opposite and parallel to the incident light beam. A drive system is provided for moving the support member parallel to the incident light beam for varying the length of the optical path.

2 Claims, 4 Drawing Figures

COPYING MACHINE CAPABLE OF CONTINUOUSLY VARYING MAGNIFICATION

BACKGROUND OF THE INVENTION

The present invention is directed to a copying machine and more specifically to a copying machine utilizing a fixed focus projecting lens in a continously variable magnification system.

It is old and well known in the art to use a zoom lens in a copying machine to vary magnification. However, such copying machines suffer from many disadvantages. The zoom lens is very expensive and the movement of the lens groups is intricate and rather troublesome since the movement must be carried out with precision.

SUMMARY OF THE INVENTION

The present invention provides a new and improved copying machine which is relatively simple in construction since a fixed focus projecting lens is employed in a system for continuously varying the magnification instead of a zoom lens.

The present invention provides a new and improved copying machine comprising a projecting lens having a fixed focus, drive means for moving the projecting lens along the optical axis thereof for varying the magnification, a parallel reflection optical system for reflecting an incident light beam in a direction parallel to the incident light beam but in the opposite direction and an optical path length adjusting drive means for moving the parallel reflection optical system in a direction parallel to the direction of the incident light beam.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
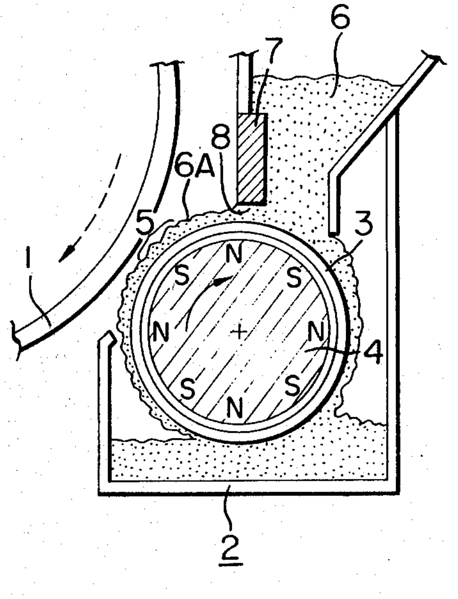
FIG. 1 is a schematic diagram of the optical system for a copying machine according to the present invention.
Figure 2:
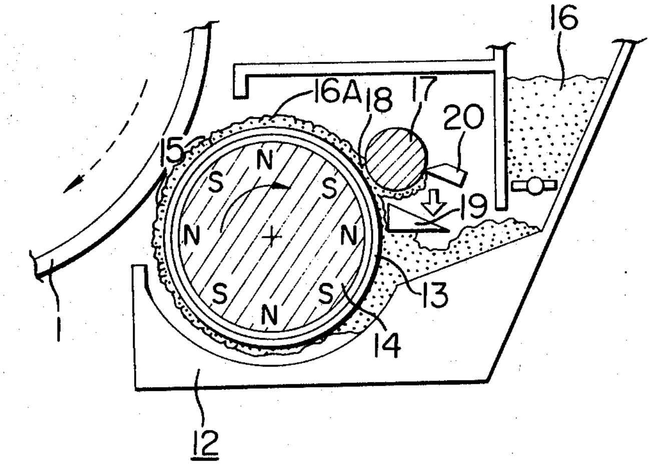
FIG. 2 is a perspective view of the mechanism for adjusting the optical path length as illustrated in FIG. 1.

The optical system for a copying machine according to the present invention is shown in FIG. 1. A microfilm 10 is illuminated through a condenser lens 12 by means of light from a lamp 14. The image from the microfilm 10 is projected onto a photosensitive drum 16 by passage through the projecting lens 18 and reflection from mirrors 20, 22, 24 and 26. The mirrors 22 and 24 are arranged at right angles relative to each other so that a projecting light beam incident to the mirror 22 is reflected by the mirror 24 parallel to but in the opposite direction to the projecting light beam incident on the mirror 22. The mirrors 22 and 24 form an optical path length adjusting optical system 28 and are carried by a movable support member 30 which is best seen in FIG. 2. The support member 30 is moved parallel to the direction of the projecting light beam incident to the mirror 22 so that the mirrors 22 and 24 may be moved from the position illustrated in solid lines in FIG. 1 to the dotted line position. In the situation where a magnification $M_1$ is selected, the distance ($S_1$) between the film 10 and the drum 16 is $S_1=f(1+1/M_1)+f(1+M_1)$ and in the case where a magnification $M_2$ is employed, the distance ($S_2$) between the film 10 and the drum 16 is $S_2=f(1+1/M_2)+f(1+M_2)$. Therefore, the amount of movement (L) of the mirrors is:

$$L = \frac{S_1 + S_2}{2} = f\frac{\left(\frac{1}{M_1} - \frac{1}{M_2}\right) + (M_1 - M_2)}{2}$$

The optical path length adjusting optical system 28 is moved by the system shown in FIG. 2. A pair of spaced apart parallel bores 32 and 34 are formed in the support member 30. The bore 32 is provided with internal threads which cooperate with an externally threaded drive rod 36 which is rotated by means of an electric motor 38 through a drive belt 40. The bore 34 is smooth and cooperates with a smooth guide rail 42 which extends therethrough. Upon rotation of the rod 36 in one direction, the optical system 28 will be moved from the solid line position to the dotted line position shown in FIG. 1 and upon rotation of the threaded rod 36 in the opposite direction the optical system 28 will be moved from the dotted line position to the solid line position.

Figure 3:
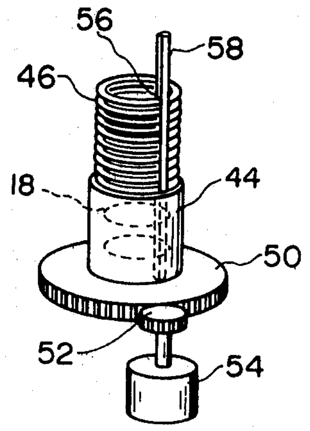
FIG. 3 is a perspective view of the mechanism for moving the fixed focus projecting lens of FIG. 1.
Figure 4:
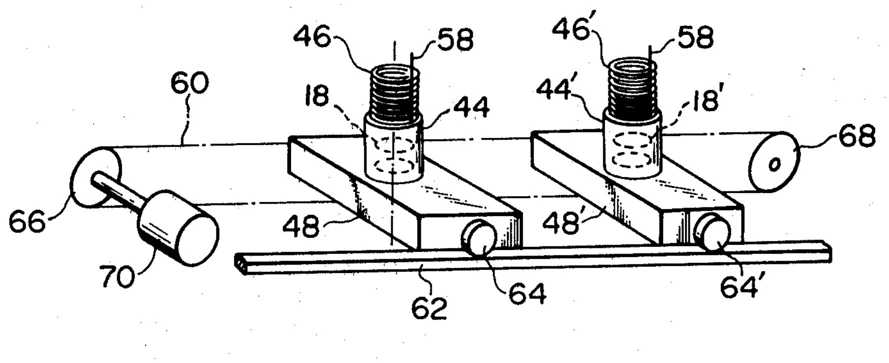
FIG. 4 is a perspective view showing the mechanism for alternately locating different projecting lenses in the optical system of FIG. 1.

The projecting lens 18 is secured within a lens barrel 46 having external threads thereon. The lens barrel 46 is disposed in threaded engagement with internal threads on a collar 44 which is rotatably mounted in a support frame 48 as best seen in FIG. 4. The collar 44 is provided with an integral gear 50 disposed in meshing engagement with a spur gear 52 which is driven by a micromotor 54 as best seen in FIG. 3. In order to prevent rotation of the lens barrel 46, a groove 56 is formed in the lens barrel 46 and a stop member 58 is inserted into the groove 56. The stop member 58 is then secured in a stationary manner to the support frame 48 so that upon rotation of the collar 44 by means of the micromotor 54 the lens barrel 46 will be raised and lowered relative to the collar 46 depending upon the direction of rotation of the micromotor 54.

In addition to the projecting lens 18 another projecting lens 18′ having a different focal length from that of the lens 18 is secured within a lens barrel 46′ which is disposed in threaded engagement with the collar 44′. The collar is rotatably mounted in a support frame 48′ identical to the support frame 48. The two support frames 48 and 48′ are each secured at one end to a common drive chain 60 in spaced apart parallel relation to each other with the opposite ends of each support frame being guided upon a guide rail 62 by means of rollers 64 and 64′, respectively. The drive chain 60 is entrained about a pair of spaced apart pulleys 66 and 68 one of which is driven by a micromotor 70 to shift the lens in opposite directions along the guide rail 62 depending upon the direction of rotation of the motor 70.

In operation, a projecting lens 18 or 18′ having the desired magnification is selected and the selected lens is moved into axial alignment with the light source 14 condenser lens 12 and microfilm 10 by operating the micromotor 70 in the proper direction. While the selected projecting lens 18 and 18′ is moved to the desired predetermined position along the axis of the projecting light beam by means of the micromotor 54, the micromotor 38 is operated to move the optical path length adjusting optical system 28 to the desired position to obtain a predetermined optical path length. While the copying machine according to the present invention is simple in construction, the magnification can be continuously varied and the magnification variation range can be changed into a wider magnification variation range when required. Therefore, copies of a predetermined size can be obtained from various microfilms of different sizes thereby facilitating the maintenance and control of copies and copying sheets.

While the invention has been particularly shown and described with reference to a preferred embodiment thereof, it will be understood by those in the art that various changes in form and details may be made therein without departing from the spirit and scope of the invention.

We claim:

1. A copying machine comprising image projecting means including a light source, a condenser lens, a microfilm station and at least one projecting lens having a fixed focus disposed in operative co-axial alignment with each other; magnification varying drive means for moving said projecting lens along the optical axis thereof comprising an externally threaded lens barrel supporting said projecting lens therein, internally threaded collar means disposed in threaded engagement with said lens barrel, drive means for rotating said collar means and stop means engaging said lens barrel to prevent rotation of said lens barrel so that upon rotation of said collar means said projecting lens will be moved axially along the optical axis thereof; a parallel reflection optical system for reflecting an incident light beam from said image projecting means in parallel opposite directions along a path disposed perpendicular to the axis of said image projecting means and having a predetermined length comprising moveable support means, first and second reflecting mirrors carried by said support means at right angles to each other, a third reflecting mirror disposed in alignment with the optical axis of said projecting lens for directing an incident beam of light from said projecting lens ninety degrees to said first reflecting mirror, a photosensitive drum having an axis disposed orthogonal to the axis of said path and a fourth reflection mirror for directing the light beam reflected by said second reflecting mirror ninety degrees onto said photosensitive drum; and optical path length adjusting means comprising drive means for moving said support means having said first and second mirrors mounted thereon in opposite directions toward and away from said third and fourth reflecting mirrors.

2. A copying machine as set forth in claim 1 further comprising a second projecting lens, first and second support means for supporting said projecting lenses with the optical axes thereof disposed in spaced apart parallel relation and drive means for alternately shifting said lenses into and out of coaxial alignment in said image projecting means.

* * * * *